(No Model.)
J. E. DENTON.
CHUCK FOR ROCK DRILLS, &c.
No. 319,202. Patented June 2, 1885.
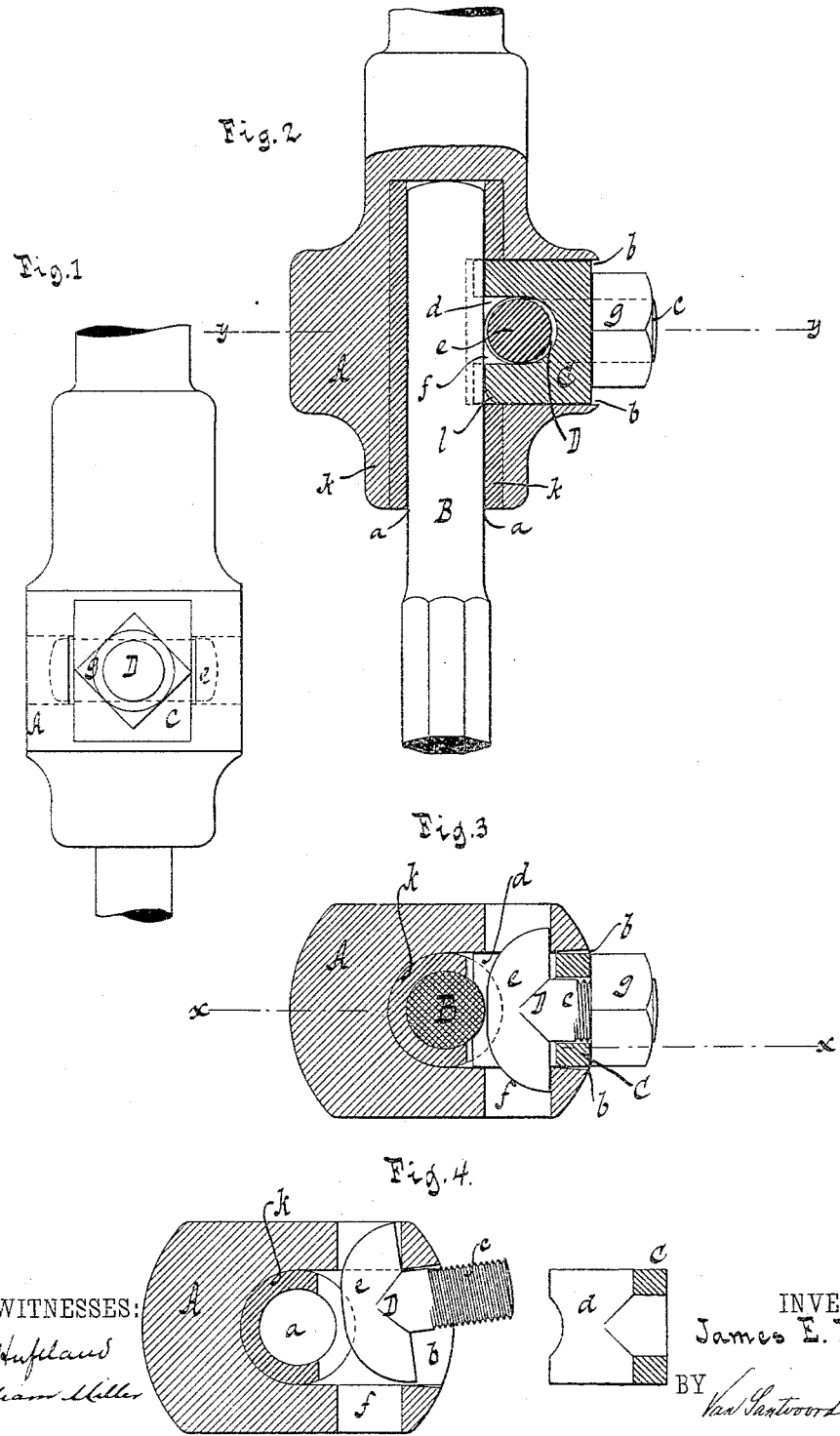
WITNESSES: 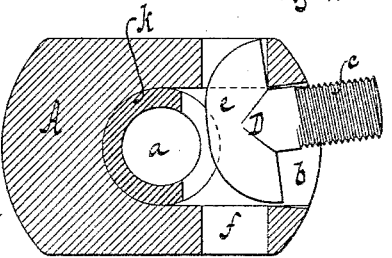
INVENTOR
James E. Denton
BY 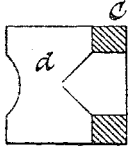
ATTORNEYS

UNITED STATES PATENT OFFICE.

JAMES E. DENTON, OF HOBOKEN, NEW JERSEY.

CHUCK FOR ROCK-DRILLS, &c.

SPECIFICATION forming part of Letters Patent No. 319,202, dated June 2, 1885.

Application filed April 9, 1885. (No model.)

*To all whom it may concern:*

Be it known that I, JAMES E. DENTON, a citizen of the United States, residing at Hoboken, in the county of Hudson and State of New Jersey, have invented new and useful Improvements in Chucks for Rock-Drills and other Articles, of which the following is a specification.

This invention has for its object to provide the head of a chuck with novel means for clamping and holding a drill or other rod; and to such end the invention consists in the novel construction and combination of devices hereinafter described and claimed, reference being made to the accompanying drawings, illustrating my invention, in which—

Figure 1 represents a face view of my chuck. Fig. 2 is a longitudinal section in the plane $x$ $x$, Fig. 3. Fig. 3 is a transverse section in the plane $y$ $y$, Fig. 2. Fig. 4 is a transverse section illustrating the manner of introducing the clamping-bolt.

Similar letters indicate corresponding parts.

In the drawings, the letter A designates the head of my chuck, which is provided with a socket, $a$, to receive the rod B. This rod represents the article to be clamped, and since my chuck is intended particularly for rock-drills, I shall term said rod in the following description the "drill-rod." In rock-drilling machines it is of the greatest importance to secure the drills in the machine in such a manner that they are not liable to work loose by the constant shocks to which they are exposed whenever their point strikes the rock. This object I have sought to accomplish by means of my chuck.

The drill-rod B fits the socket $a$ snugly, and in the side of the head is a cavity, $b$, into which is fitted the clamping-jaw C. This jaw is bored out to admit the shank $c$ of the clamping-bolt D, (see Fig. 3,) and its inner surface is provided with a cavity, $d$, so that it can straddle the head $e$ of the clamping-bolt. (See Fig. 1.)

The head A of the chuck is provided with a transverse channel, $f$, into which the head $e$ of the clamping-bolt is introduced in the manner indicated in Fig. 4, the cavity $b$ being wide enough to permit the clamping-bolt to assume an oblique position, and to pass the head $e$ down into the channel $f$, first on one and then on the opposite side of the cavity $b$. After the bolt-head has been inserted into said channel the clamping-jaw C is introduced into the cavity $b$, and the nut $g$ is screwed on the bolt, as shown in Fig. 3. When the nut is screwed up, the clamping-jaw is forced inward, so that its inner surface bears against the drill-rod on opposite sides of the bolt-head, as shown in Fig. 1, and the drill-rod is clamped between the unyielding inner surface of the socket $a$ in the head A on one side and the inner surface of the clamping-jaw on the opposite side. When the drill strikes the rock, violent lateral wrenching is liable to occur at the chuck end of the drill-rod, tending to force the jaw C out of the cavity $b$. Thereby the nut $g$ of the clamping-bolt is strained to and fro in the direction of the length of the bolt. If the latter were inextensible, or so short as to be practically inextensible, the strain upon the nut would cause a permanent yielding of the screw-thread sufficient to so far reduce the friction between the inner face of the nut and the clamping-jaw as to allow the nut to be quickly unscrewed by the mere force due to the blows delivered upon the rock. If, however, the clamping-bolt constitutes an elastic medium to transmit the lateral wrenching or strain to the nut, any permanent yielding of the thread is counteracted by the equal amount of contraction of the bolt, so that the friction between the inner surface of the nut and the outer surface of the clamping-jaw is not decreased sufficiently to permit the nuts to unscrew under the force due to blows upon the rock. In my chuck, as above described, the necessary elasticity is supplied partly by the length of the bolt D and partly by the transverse flexure of the cross-bar forming the head $e$ of the bolt.

The socket $a$ in the head A is provided with a bushing, $k$, a portion of which is cut away, so as to admit the inner end of the clamping-jaw C, and to allow the same to bear upon the drill-rod. At the same time the clamping-jaw serves to retain the bushing in its place and prevents it from dropping out. The lower edge, $l$, of the clamping-jaw is round, to facilitate the introduction of the drill-rod. If desired, the bushing may be dispensed with.

What I claim as new, and desire to secure by Letters Patent, is—

1. The combination, in a chuck, of the head

A, having a socket forming a rigid bearing, and provided with the transverse channel $f$ and cavity $b$, opening thereinto, with the recessed clamping-jaw C, fitting the said cavity, and the clamping-bolt having a shank extending outward through the jaw, and an elongated head, $e$, arranged in the recess of the jaw, and extending into the transverse channel and abutting against a part of the head, substantially as described.

2. The combination, in a chuck, of the head having a socket and a cavity, $b$, the annular bushing $k$, arranged in the socket and having one side recessed, and the clamping-jaw C, arranged in the said cavity, and having its inner end portion entering the recess of the bushing, to bear directly on the drill-rod, for retaining the bushing and clamping the said drill-rod, substantially as described.

In testimony whereof I have hereunto set my hand and seal in the presence of two subscribing witnesses.

JAMES E. DENTON. [L. S.]

Witnesses:
W. HAUFF,
E. F. KASTENHUBER.